(12) United States Patent
Finley et al.

(10) Patent No.: US 11,514,491 B2
(45) Date of Patent: *Nov. 29, 2022

(54) MULTI-FORMAT ELECTRONIC INVOICING SYSTEM

(71) Applicant: Hartford Fire Insurance Company, Hartford, CT (US)

(72) Inventors: Cynthia D Finley, Lyme, CT (US); Linda L. Ternullo, Tolland, CT (US); Manuela Panno, Rocky Hill, CT (US); Antonio Jorge, Stafford Spring, CT (US); Benjamin D. Arunski, West Hartford, CT (US); Lakshmi Elango, South Windsor, CT (US); Mary N. Udeh, East Hartford, CT (US); David S. Fuller, Westfield, MA (US); John J Sedor, Suffield, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,565

(22) Filed: May 9, 2022

(65) Prior Publication Data
US 2022/0261866 A1 Aug. 18, 2022

Related U.S. Application Data

(63) Continuation of application No. 16/454,781, filed on Jun. 27, 2019, now Pat. No. 11,361,351.

(51) Int. Cl.
*G06Q 30/04* (2012.01)
*H04L 51/18* (2022.01)

(52) U.S. Cl.
CPC ............. *G06Q 30/04* (2013.01); *H04L 51/18* (2013.01)

(58) Field of Classification Search
CPC .......... G06Q 30/04; H04L 51/18; H04L 51/08
See application file for complete search history.

(56) References Cited

U.S. PATENT DOCUMENTS

| 2011/0251952 A1* | 10/2011 | Kelly | G06Q 20/102 |
| | | | 705/40 |
| 2021/0027054 A1* | 1/2021 | Bhatnagar | G06V 30/418 |

* cited by examiner

*Primary Examiner* — Joe Chacko
(74) *Attorney, Agent, or Firm* — Buckley, Maschoff & Talwalkar LLC

(57) ABSTRACT

According to some embodiments, an invoice data store contains electronic records for invoices associated with customers and an enterprise. An electronic invoicing system computer server may receive invoice data (associated with a customer of the enterprise) from remote invoice platforms, and the server may create invoice documents in first and second formats based on information in the invoice data store. It may be determined that the invoice documents represent "work in process" and, as a result, the system may prevent the invoice documents from being transmitted to a customer device. An adjustment to the invoice document in an intermediate format is received and the invoice document in at least one of the first and second format is automatically updated. When it is later determined that the invoice documents no longer represent "work in process," the system electronically transmits the invoice documents to the customer device.

20 Claims, 17 Drawing Sheets

FIG. 5

ELECTRONIC INVOICING: RESULTS

| Status | Invoice # | Account # | Account Name | Analyst ID | Date |
|---|---|---|---|---|---|
| delet | | | | | |
| Deleted | I246801 | A97531 | Ribs Partners | GREENE | 3/6/2025 |
| Deleted | I357902 | A08642 | Camp Inc. | BUCKLEY | 3/11/2025 |
| Deleted | I531096 | A13579 | Enterprise Co. | TEMP_01 | 4/2/2025 |

RESET VIEW

FIG. 6

ELECTRONIC INVOICING: RESULTS

| Status | Invoice # | Account # | Account Name | Analyst ID | Date |
|---|---|---|---|---|---|
| comp | | | | | |
| Completed | I192837 | A28384 | Trash Inc. | JOHNSON | 3/3/2025 |
| Completed | I928374 | A91823 | Deli LLC | STONE | 3/3/2025 |
| Completed | I564738 | A75940 | Cleaner Inc. | REED | 3/4/2025 |
| Completed | I657483 | A56473 | IRS Help.com | BOOTH | 3/4/2025 |

RESET VIEW

FIG. 7

ELECTRONIC INVOICING:
INVOICE MANAGEMENT – UNPROCESSED SCHEDULES (3)

| SCHEDULE DATE | INVOICE TYPE | INVOICE LEVEL | WIP | Suppress | LAST UPDATED — 810 |
|---|---|---|---|---|---|
| 3/14/2025 | LOSS | | ☑ | ☐ | WEST (3/1/2025) |
| 3/16/2025 | LOSS IN SERVICE | | ☐ | ☑ | JONES (3/2/2015) |
| 3/17/2025 | LOSS | | ☑ | ☑ | JONES (3/3/2015) |

SORT — 890

FIG. 8

ELECTRONIC INVOICING:
INVOICE SCHEDULE DETAILS – ADD NEW TYPE

Invoice Type — Select Invoice Type

Invoice Level — Account: ● Product: ○ Org: ○

Schedule Start Date

Schedule End Date

Payment — Days

Payment Method — Select Payment Method

SAVE

FIG. 10

MULTI-FORMAT ELECTRONIC INVOICING SYSTEM

CROSS REFERENCE TO RELATED APPLICATION

This is a continuation of U.S. patent application Ser. No. 16/454,781, entitled "MULTI-FORMAT ELECTRONIC INVOICING SYSTEM," filed on Jun. 27, 2019, the entire contents of which are incorporated herein by reference for all purposes.

BACKGROUND

An enterprise may need to provide invoices to customers. For example, an enterprise might enter into risk relationships associated with an entity (e.g., as a form of risk management). In this case, an insurer might enter insurance agreements with customers (e.g., associated with large deductible, self-insured programs associated with workers' compensation such as a Third-Party Administrator ("TPA") program) in connection with an employer and a set of employees. As a result of these agreements, the insurer may periodically provide invoice documents to customers. Such invoice documents may need to be particular formats, including specific supporting documentation, etc. Manually generating such documents can be a time-consuming and error-prone task—especially when a substantial number of documents are involved (e.g., thousands of invoices might be generated each month. Moreover, the enterprise may want to accurately populate and/or utilize the content of one or more electronic records associated with those risk relationships. For example, more accurate electronic records may improve the performance of the enterprise by reducing errors (and the need to re-enter information), facilitate communication between parties, help allocate appropriate resources, etc. Note that improving the accuracy of electronic records may result in substantial improvements to the operation of a network (e.g., by reducing an overall number of electronic messages that need to be created and transmitted via various networks or improving response times).

It would be desirable to provide systems and methods to facilitate the creation of electronic invoice documents and messaging in a way that provides efficient and accurate results.

SUMMARY OF THE INVENTION

According to some embodiments, an invoice data store contains electronic records for invoices associated with customers and an enterprise, including an electronic record identifier and a set of attribute values. An electronic invoicing system computer server may receive invoice data (associated with a customer of the enterprise) from remote invoice platforms, and the server may create invoice documents in first and second formats based on information in the invoice data store. It may be determined that the invoice documents represent "work in process" and, as a result, the system may prevent the invoice documents from being transmitted to a customer device. An adjustment to the invoice document in an intermediate format is received and the invoice document in at least one of the first and second format is automatically updated. When it is later determined that the invoice documents no longer represent "work in process," the system electronically transmits the invoice documents to the customer device.

Some embodiments comprise: means for receiving, by a electronic invoicing system computer server, invoice data from a plurality of remote invoice platforms, the received data being associated with a customer of an enterprise; means for arranging to create an invoice document in a first format and an invoice document in a second format, different than the first format, based on information in an invoice data store containing electronic records representing a plurality of invoices associated with multiple customers and the enterprise and, for each invoice, an electronic record identifier and a set of attribute values; means for determining that the invoice documents represent "work in process;" responsive to the determination that the invoice documents represent "work in process," means for preventing the invoice documents from being transmitted to at least one remote customer device; means for receiving from a user an adjustment to the invoice document in an intermediate format; means for automatically updating the invoice document in at least one of the first and second format based on the received adjustment from the user; means for determining that the invoice documents no longer represent "work in process;" and responsive to the determination that the invoice documents no longer represent "work in process," means for arranging to electronically transmit the invoice documents in the first and second formats to the at least one remote customer device.

In some embodiments, a communication device associated with an electronic invoicing system computer server exchanges information with remote devices in connection with an interactive graphical user interface. The information may be exchanged, for example, via public and/or proprietary communication networks.

A technical effect of some embodiments of the invention is an improved and computerized way to facilitate the creation of electronic invoice documents and messaging in a way that provides efficient and accurate results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 5 is a billing invoice Work in process ("WIP") display according to some embodiments.

FIG. 6 is a billing invoice completed display in accordance with some embodiments.

FIG. 7 is a billing invoice completed display according to some embodiments.

FIG. 8 is an invoice management display in accordance with some embodiments.

FIG. 10 is an invoice schedule details display that may be used to add new invoice types in accordance with some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic document and/or record attribute update, utilization, and/or analysis by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via an electronic invoicing system computer server to accurately improve the exchange of information, thus improving the overall efficiency of the system associated with message storage requirements and/or bandwidth considerations (e.g., by generating documents in multiple file formats, by reducing the number of messages that need to be transmitted via a network, by improving response times by flagging invoices that need supporting documents attached, and/or by creating more complete and/or accurate documents). Moreover, embodiments associated with collecting accurate information might further improve risk values, predictions of risk values, allocations of resources, electronic record processing decisions, etc.

Figure 1:
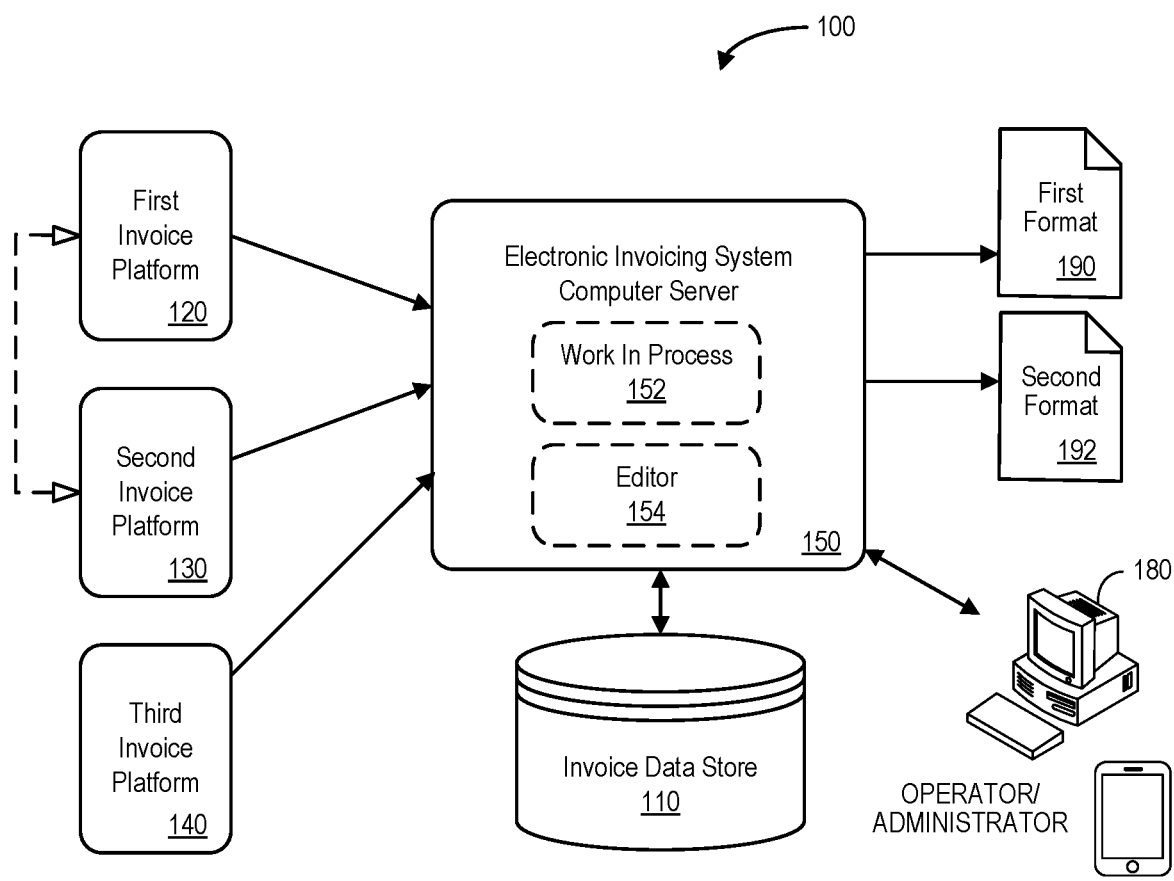
FIG. 1 is a high-level block diagram of a system in accordance with some embodiments.

In some cases, an enterprise may need to generate invoice documents in various file formats. Manually creating these multiple documents for an enterprise, however, can be a time consuming and error prone process, especially when a substantial number of electronic records, customers, invoice rules, and/or file formats may influence the behavior of the system. To address this issue, FIG. 1 is a high-level block diagram of a system 100 according to some embodiments of the present invention. In particular, the system 100 includes an electronic invoicing system computer server 150 that may access information in an invoice data store 110 (e.g., storing a set of electronic records representing invoices, each record including, for example, one or more invoice identifiers, customer identifiers, insurance policy identifiers, attribute variables, resource values, etc.). The electronic invoicing system computer server 150 may also exchange information with invoice platforms 120, 130, 140 (e.g., including platforms associated with one or more legacy invoicing systems) to verify, update, and/or utilize the electronic records. The electronic invoicing system computer server 150 may also exchange information with a remote operator or administrator device 180 (e.g., via a firewall). According to some embodiments, an interactive graphical user interface platform of the electronic invoicing system computer server 150 (and, in some cases, third-party data) may facilitate invoice document creation, decisions, predictions, and/or the display of aggregated results via one or more remote administrator displays or portals (e.g., to gather additional information about invoices) to view work in process 152 and/or use an editor 154 to update documents. For example, a remote administrator device 180 may receive a summary associated with multiple customers from the electronic invoicing system computer server 150. Based on a review of the summary or information from invoice platforms 120, 130, 140, the electronic invoicing system computer server 150 may adjust data in the invoice data store 110, automatically create or update an invoice document, generate electronic messages or calendar events, etc. Note that the electronic invoicing system computer server 150 and/or any of the other devices and methods described herein might be associated with a third party, such as company that performs a service for an enterprise.

The electronic invoicing system computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" electronic invoicing system computer server 150 (and/or other elements of the system 100) may facilitate updates and utilization of electronic records in the invoice data store 110. As used herein, the term "automated" may refer to, for example, actions that can be performed with little (or no) intervention by a human.

As used herein, devices, including those associated with the electronic invoicing system computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The electronic invoicing system computer server 150 may store information into and/or retrieve information from the invoice data store 110. The invoice data store 110 might, for example, store electronic records representing a plurality of invoice documents, each electronic record having a set of attribute values. The invoice data store 110 may also contain information about prior and current interactions with parties, including those associated with invoice platforms 120, 130, 140 and remote devices 180. The invoice data store 110 may be locally stored or reside remote from the electronic invoicing system computer server 150. As will be described further below, the invoice data store 110 may be used by the electronic invoicing system computer server 150 in connection with an interactive user interface to create invoice documents 190, 192 in various file formats. Although a single electronic invoicing system computer server 150 is shown in FIG. 1, any number of such devices may be included. Moreover, various devices described herein might be combined according to embodiments of the present invention. For example, in some embodiments, the electronic invoicing system computer server 150 and a document or image server might be co-located and/or may comprise a single apparatus.

Figure 2:
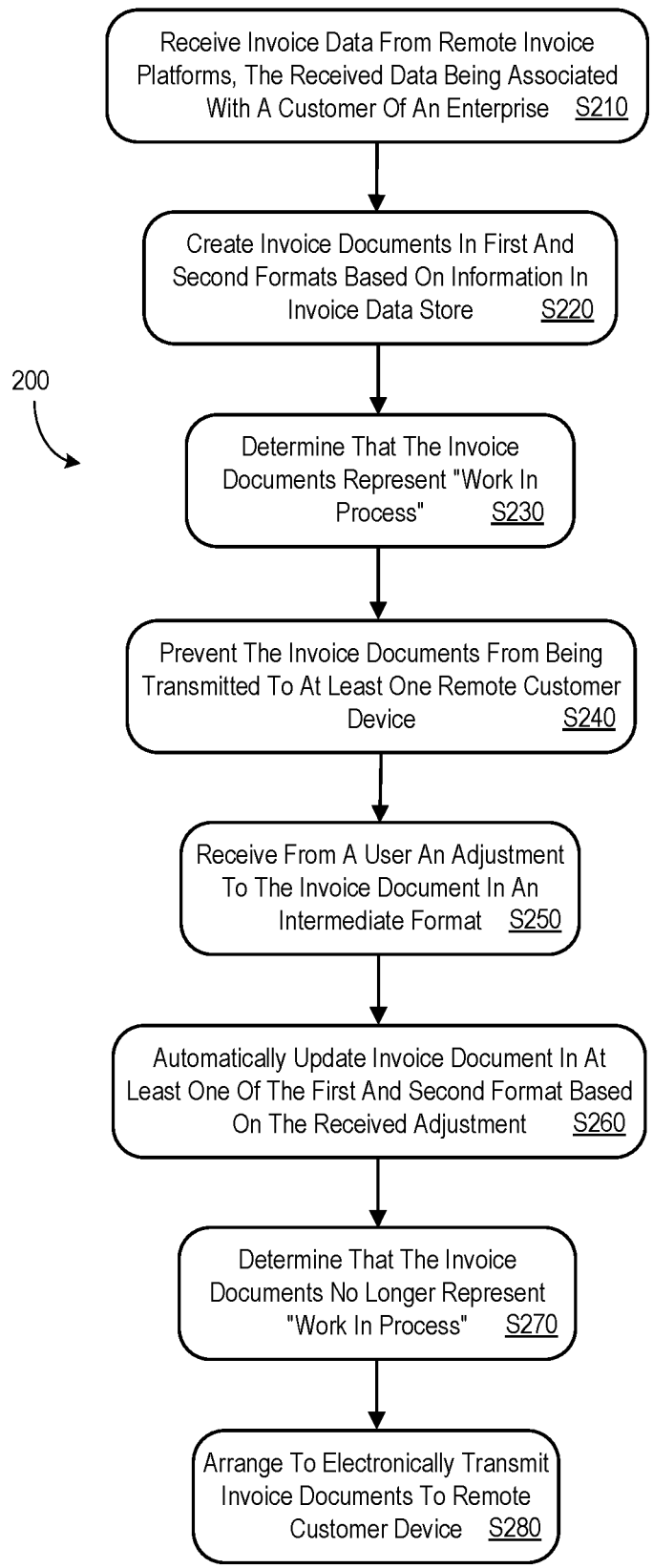
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an electronic invoicing system computer server may receive invoice data from a plurality of remote invoice platforms, and the received data may be associated with a customer of the enterprise. The set of attribute values might include, by way of examples only, a status (e.g., completed or deleted), an invoice number, an account number, an account name, a billing analyst identifier, a creation date, an invoice type, a "mailed to" indication, a "last edited identifier", a "last edited" date, etc. As still further examples, the set of attribute values might include an invoice level, a schedule start date, a schedule end date, an invoice frequency, a payment date, a payment method, a "suppress output" indication, product grouping information, etc.

At S220, the system may arrange to create an invoice document in a first format and an invoice document in a second format, different than the first format. According to some embodiments, the invoice documents may be based on information in an invoice data store that contains electronic records representing a plurality of invoices associated with multiple customers and the enterprise (e.g., an electronic record identifier and a set of attribute values for each invoice).

At least one of the first and second formats may comprise, for example, a Comma-Separated Values ("CSV") format such as a delimited text file that uses a comma to separate values. A CSV file may store tabular data (numbers and text) as plain text and each line of the file may comprise a data record (having one or more fields separated by commas). As used herein, the term "CSV" may also refer to other delimiter-separated formats that use different field delimiters (e.g., semicolons, tab-separated values, space-separated values, etc.). One example of a CSV file format is Request For Comment ("RFC") 4180 created by the Internet Engineering Task Force ("IETF"). In general, a CVS file may include plain text (e.g., American Standard Code for Information Interchange ("ASCII"), Unicode character sets such as Unicode Transformation Format ("UTF")-8, Extended Binary Coded Decimal Interchange Code ("EBCDIC"), Shift Japanese Industrial Standards ("HS"), etc.) forming records divided into fields separated by delimiters and every record has the same sequence of fields.

According to some embodiments, at least one of the first and second formats is associated with a Portable Document Format ("PDF") document, including text formatting and images, encoded in a manner independent of application software, hardware, and/or operating systems. Based on the PostScript language, a PDF file may encapsulate a complete description of a fixed-layout flat document, including the text, fonts, vector graphics, raster images, etc. as set forth, for example in International Organization for Standardization ("ISO") 32000. Note that a PDF file may contain content besides flat text and graphics including logical structuring elements, interactive elements such as annotations and form-fields, layers, rich media (including video content), three-dimensional objects, etc. A PDF document may also includer encryption and digital signatures, file attachments, and/or metadata to enable workflows. In addition to (or instead of) CSV and PDF file formats, embodiments might be associated with an Active Service Profile ("ASP") files, text files, spreadsheet application files, graphical files (e.g., in BMP or JPEG formats), email files, calendar entries, etc.

At S230, the system may determine that the invoice documents represent "work in process." This determination might comprise, for example, receiving a designation from a user via an invoicing system interface display. In other cases, the system may automatically apply a rule to the set of attribute values (e.g., all invoices of a particular type that do not include an attachment or that are missing certain pieces of information might automatically be designated as a "work in process"). In addition to a "work in process," a document might be associated with other designations such as "deleted," "complete," etc.

Responsive to the determination that the invoice documents represent "work in process," at S240 the system may prevent the invoice documents from being transmitted to at least one remote customer device. That is, because the document is still being worked on (and is not complete) it is not yet ready to be provided to a customer. At S250, the system may receive from a user (e.g., a billing analyst) an adjustment to the invoice document in an "intermediate" format. As used herein, the phrase "intermediate format" might refer to, for example, a file format other than the first or second formats. Examples of an intermediate file format might include a text editor, a What You See Is What You Get ("WYSIWYG") file format, a Hyper-Text Markup Language ("HTML") editable representation, etc. According to some embodiments, the intermediate file format might comprise one of the first and second file formats. At S260, the system may automatically update the invoice document in at least one of the first and second format based on the received adjustment from the user. For example, if the user updates a PDF version of an invoice then the CSV version might be automatically updated to reflect those changes.

At S270, the system may determine that the invoice documents no longer represent "work in process" (e.g., by user designation or application of a rule). Responsive to the determination that the invoice documents no longer represent "work in process," the system arranges to electronically transmit the invoice documents in the first and second formats to the at least one remote customer device at S280. According to some embodiments, a printed version of the invoice documents is also sent to a customer address via postal mail (e.g., delivery by the US Postal Service ("USPS")).

Figure 3:
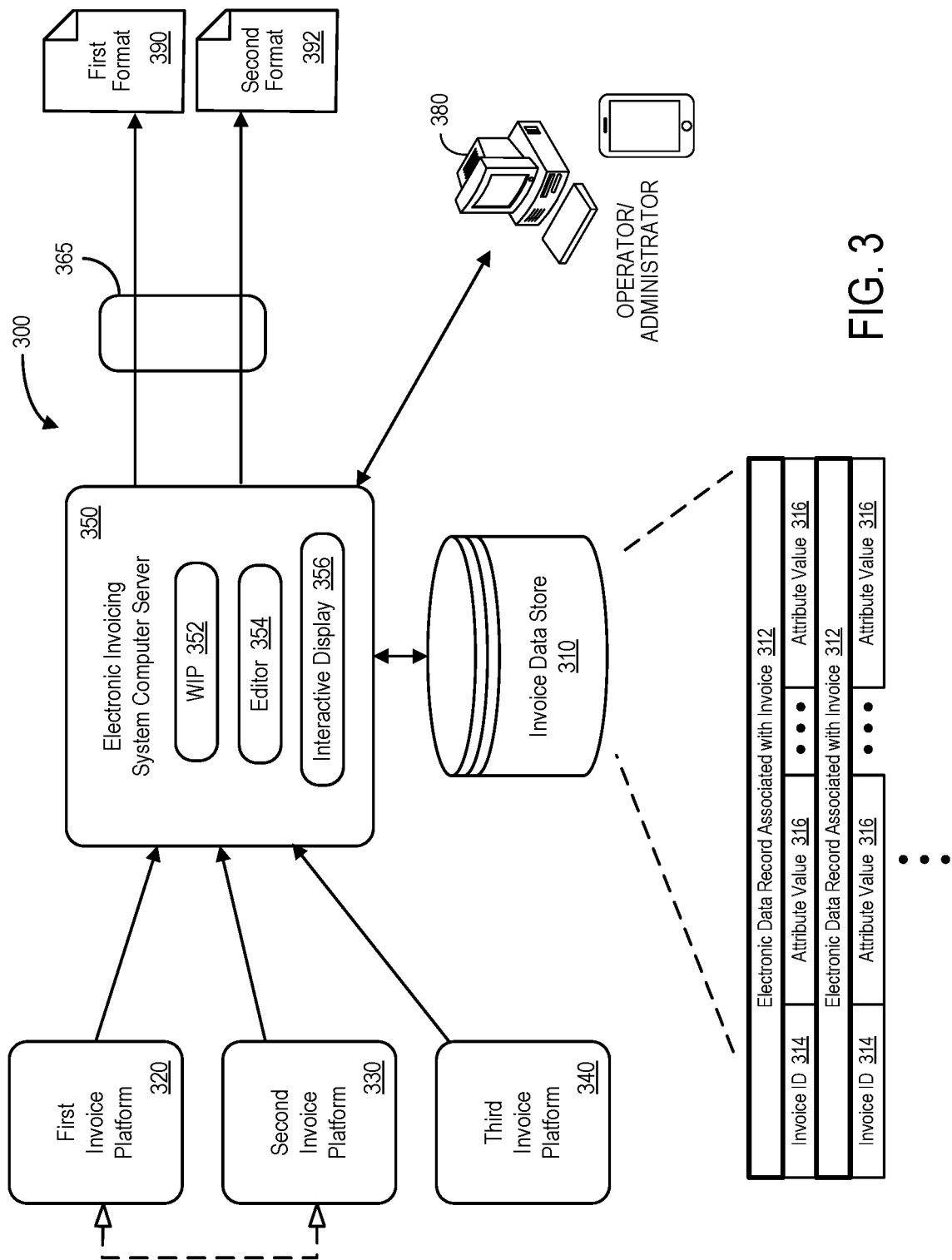
FIG. 3 is a more detailed block diagram of a system according to some embodiments.

In this way, a system may let users update electronic records associated with invoices and customers working with an enterprise. According to some embodiments, "risk relationships" are associated with insurance policies and at least some resource values are associated with insurance programs or agreement. FIG. 3 is a more detailed block diagram of a system 300 according to some embodiments. As before, the system 300 includes an electronic invoicing system computer server 350 that may access information in an invoice data store 310 (e.g., storing a set of electronic records 312 representing invoice, each record including, for example, one or more invoice identifiers 314, attribute variables 316, etc.). The electronic invoicing system computer server 350 may also receive information from invoice platforms 320, 330, 340 (e.g., associated with legacy invoicing systems of the enterprise) to update or utilize the electronic records. The electronic invoicing system computer server 350 may output a CSV invoice document 390 (first format) and a PDF invoice document 392 (second format), such as via a firewall 365, an operator or administrator terminals 380, etc. According to some embodiments, the electronic invoicing system computer server 350 processes Work In Process ("WIP") 352, a file editor 354, and an interactive graphical user interface platform 356 may facilitate document creation, decisions and review, invoice archiving and delivery, and/or the display of results via one or more remote administrator computers 380. The interactive graphical user interface may also let a user associate a user note and/or help the user search for a customer account.

According to some embodiments, the electronic invoicing system computer server 350 may also receive external information, such as third-party data, document data, governmental data, etc. This data might be used, for example, to pre-populate fields in the invoice data store 310. A user may then review the information (e.g. via an invoice platform 320, 330, 340 or the remote administrator device 380) and transmit updated information to the electronic invoicing system computer server 350. Based on the updated information, the electronic invoicing system computer server 350 may adjust or utilize data in the invoice data store 310 and automatically generate the appropriate documents 390, 392. According to some embodiments, the electronic invoicing system computer server 350 may transmit information to an email server, workflow application, or calendar function (e.g., to generate reminders when a customer needs to perform a certain action). Similarly, the electronic invoicing system computer server 350 might transmit updated electronic records 312 to a banking or accounting program to update account receivable information, account balances, etc.

Some embodiments let billing analysts and/or customers establish two-way connections with an enterprise via invoice platforms 320, 330, 340 and portals without letting legacy system communicate directly with each other. In other embodiments, the invoice platforms 320, 330, 340 may be able to communicate with each other (as illustrated by a dashed arrow in FIG. 1).

Thus, embodiments may deliver invoices electronically in both CSV and PDF formats. In addition, some invoices may need manual intervention prior to processing. The system 300 may take invoice data into a WIP status. Once in WIP, some of the fields the document may be modified, and a personalized billing note may be added to the document. Once released from WIP, the system 300 may push the completed documents 390, 392 out electronically. According to some embodiments, the system may track, modify, and/or publish the invoice documents 390, 392.

Figure 4:
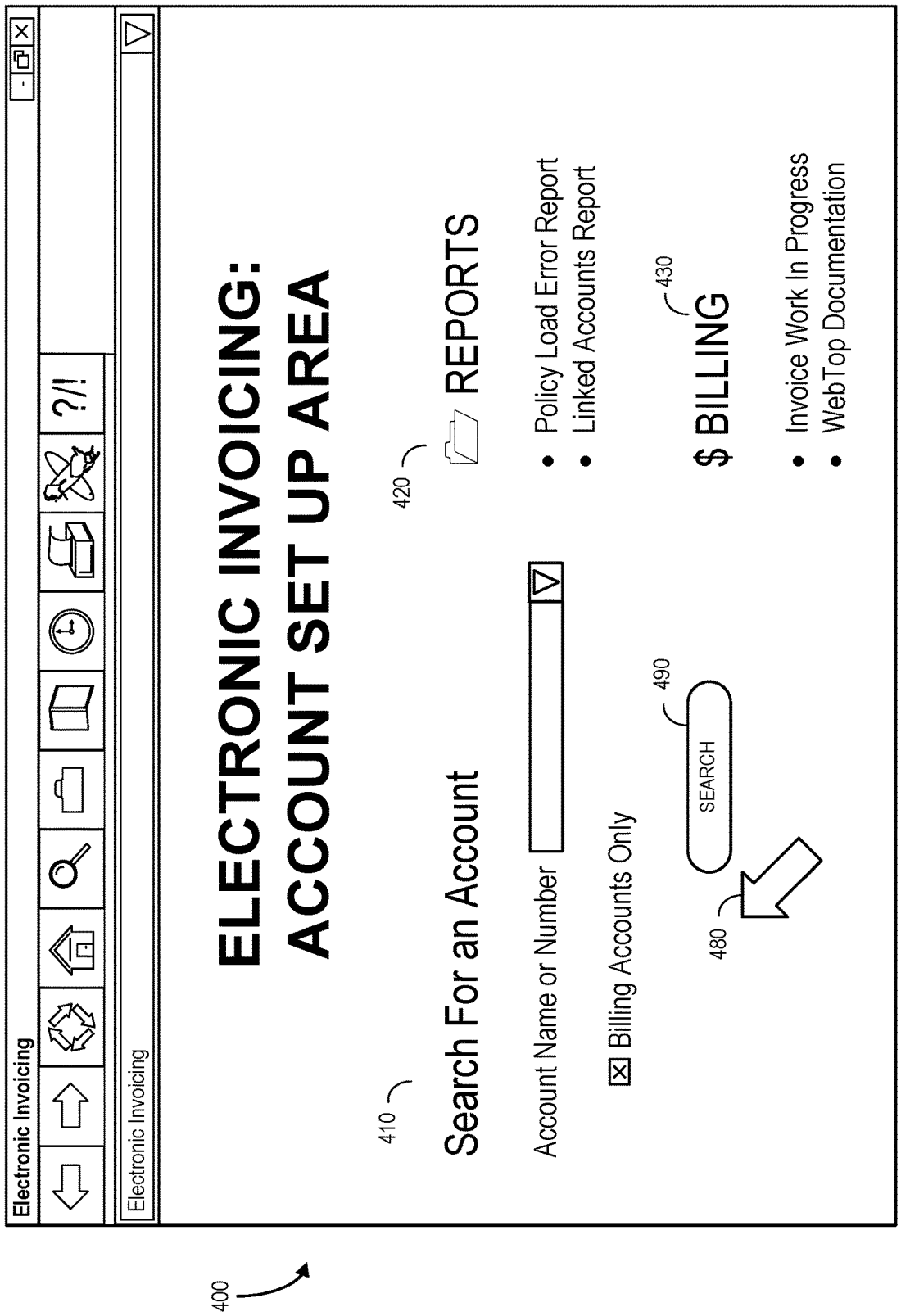
FIG. 4 is an account set up display in accordance with some embodiments.

FIG. 4 is an account set up display 400 in accordance with some embodiments. The display 400 includes an account search area 410 (e.g., containing an account name or number input portion, a "billing accounts only" selection, etc.) and selection of an element via a touchscreen or computer mouse pointer 480 may let a user view additional information (e.g., via a pop-up window) and/or adjust information on the display 400. The display 400 may further include report data 420 and billing information 430. Selection of a "Search" icon 490 might let the user generate search results based on the account name or number.

If a billing analyst sets a flag to WIP (or if the system detects pre-set conditions based on a set of rules), the automatic flow to publish the invoice documents and create the CSV and/or PDF files may be interrupted. At this point, the document can be opened and edited. If the document is edited, but not finished, the last person to edit the document may be displayed in the queue. Edits in the document may update both the CSV version and the PDF version of the document. Once marked "complete," the documents may be placed back into the publishing flow for email (and/or print) delivery. The system may also have the option to delete the system generated invoice if needed. If a document is deleted, it may still be archived. However, delivery of the document may be suppressed and/or the document may be hidden from customer view.

Figure 5:
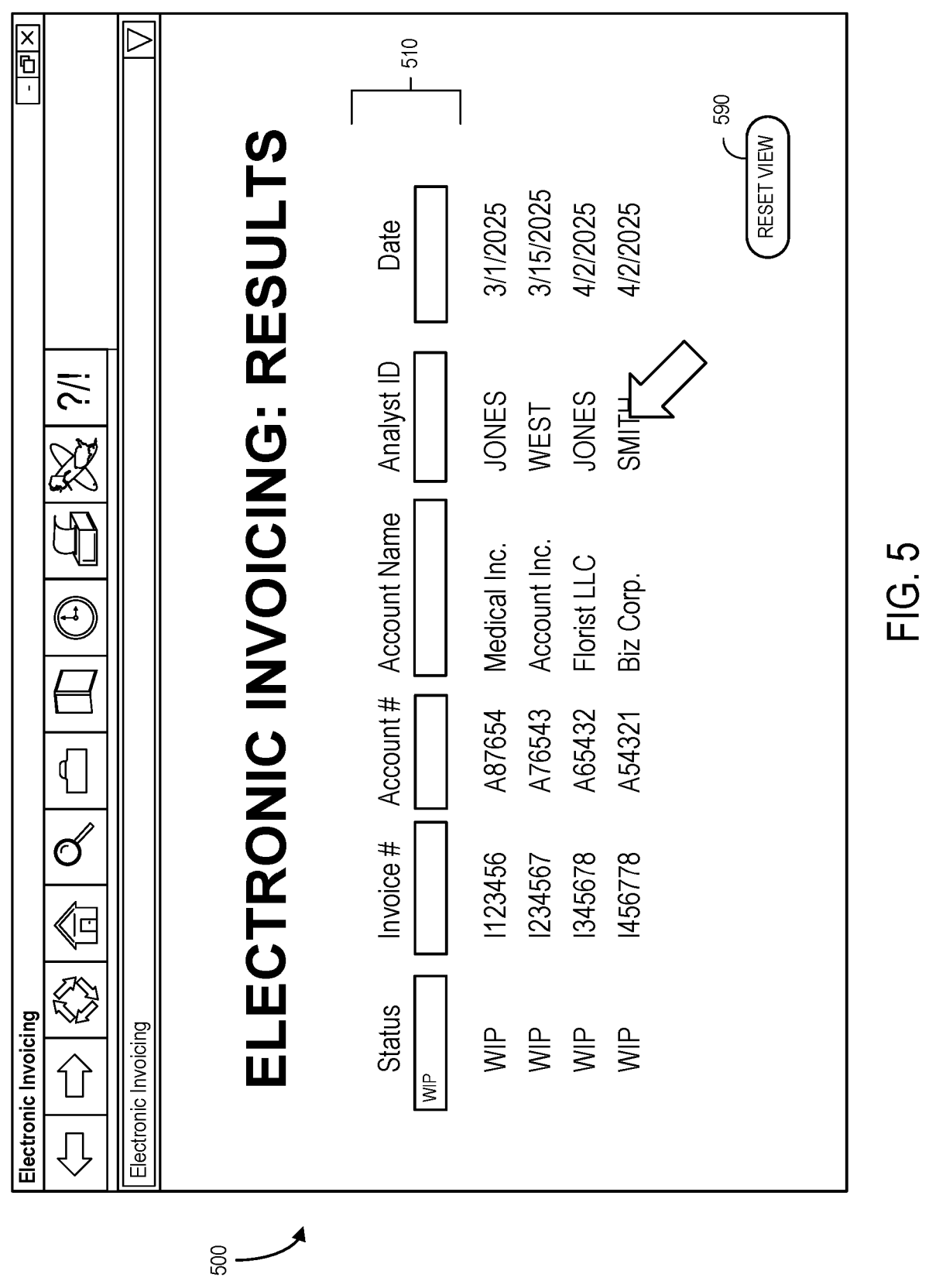

FIG. 5 is a billing invoice WIP display 500 according to some embodiments. In particular, the display 500 includes search result data 510 after a user has entered "WIP" status as a search term. The search result data 510 includes an invoice identifier or number, an account identifier or number, an account name, an analyst identifier or name, a date (e.g., a date when the record was created or modified), an invoice type, etc. Note that history may be maintained for both completed and deleted invoice documents and selection of a "Reset View" icon 590 may result in a return to a display that contains all of the invoice records. FIG. 6 is a billing invoice completed display 600 in accordance with some embodiments. In this case, the display 600 includes search result data 610 after a user has entered "delet" status as a search term. The search result data 610 includes information similar to that described with respect to FIG. 5. Note that selection of a "Reset View" icon 690 may result in a return to a display that contains all of the invoice records. FIG. 7 is a billing invoice completed display 700 according to some embodiments. Here, the display 700 includes search result data 710 after a user has entered "comp" status as a search term. The search result data 710 includes information similar to that described with respect to FIG. 5. Note that selection of a "Reset View" icon 790 may result in a return to a display that contains all of the invoice records.

FIG. 8 is an invoice management display 800 in accordance with some embodiments. The display 800 includes management data 810 including a schedule date, an invoice type, an invoice level, a WIP indication, a suppression indication, a who/when last updated, etc. Note that selection of the suppression indication may prevent future version of the associated invoice document from being transmitted to customers. Selection of a "Sort" icon 890 may result in the electronic records being re-arranged based on various search criteria.

Figure 9:
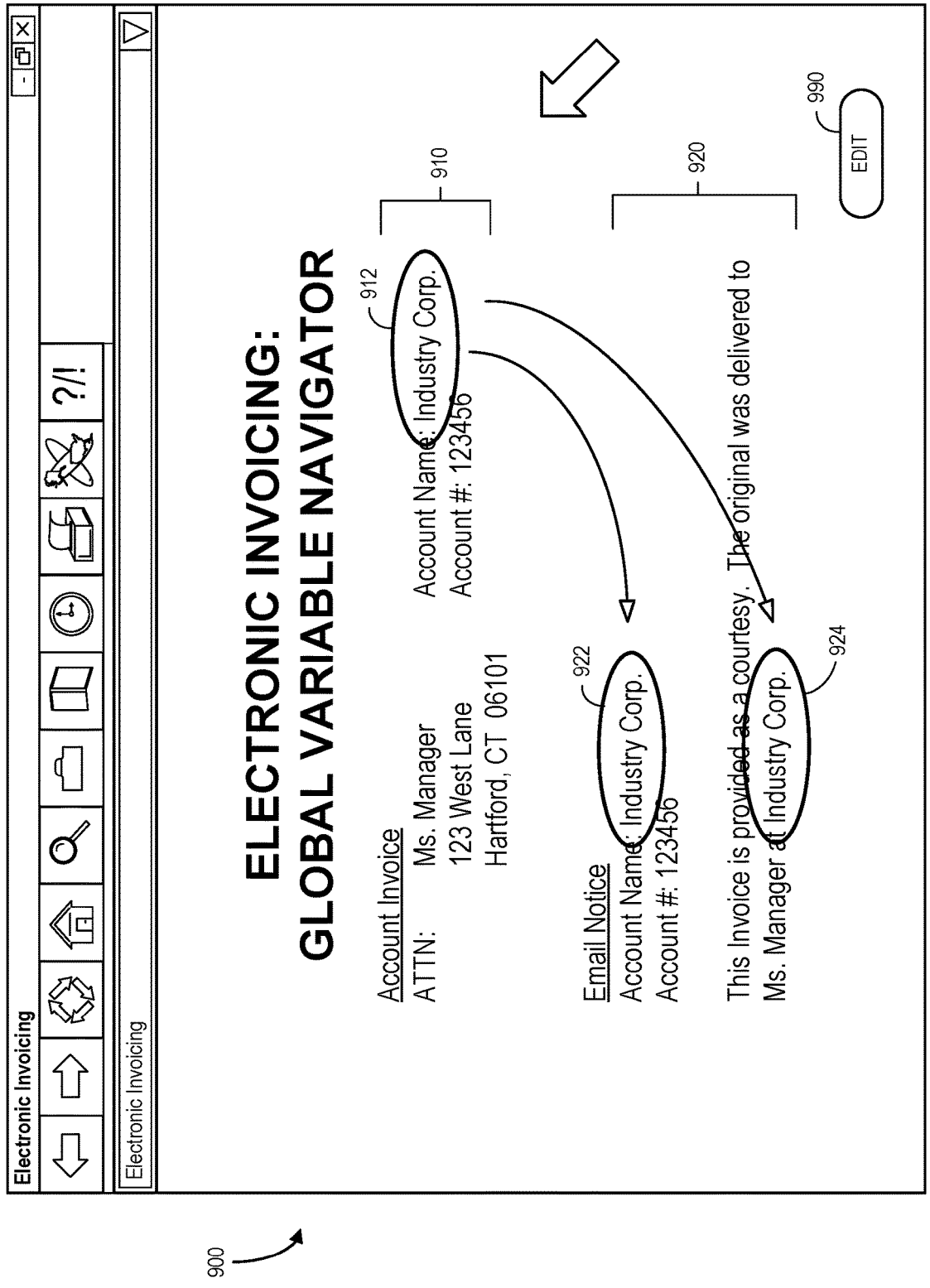
FIG. 9 illustrates a global variable navigator display updating multiple files, records, or documents according to some embodiments.

FIG. 9 illustrates a global variable navigator display 900 updating multiple files, records, or documents according to some embodiments. In particular, the display 900 shows first document information 910 and second document information 920 (e.g., representing CSV data, PDF data, etc.). Note that update of the account name 912 in the first document information 910 (e.g., after selection of an "Edit" icon 990) will automatically be reflected in the account names 922, 924 of the second document information 920. Thus, some aspects of an invoice may be editable (e.g., via a "Global Variable Navigator") and editing a value in one place may cause it to update through multiple available publishing routes: CSV, print, PDF, email, etc.

FIG. 10 is an invoice schedule details display 1000 that may be used to add new invoice types via a data entry area 1010 in accordance with some embodiments. The display 1000 includes an ability to select a new invoice type from a drop-down menu (e.g., an annual prefunded reassessment, a loss, a loss and service, a retrospective premium, risk engineering or loss control, service, a Third-Party Administrator ("TPA") invoice, etc.). According to some embodiments, the display 1000 lets a user designate an account level invoice, a product level invoice (set up after initial conversion but before first invoice cycle), an organization unit level invoice, etc. Moreover, the display 1000 may designate payment terms (at invoice schedule level), invoice attributes (e.g., WIP and output suppression). A "Save" icon 1090 may be used to store the new type of information.

Figure 11:
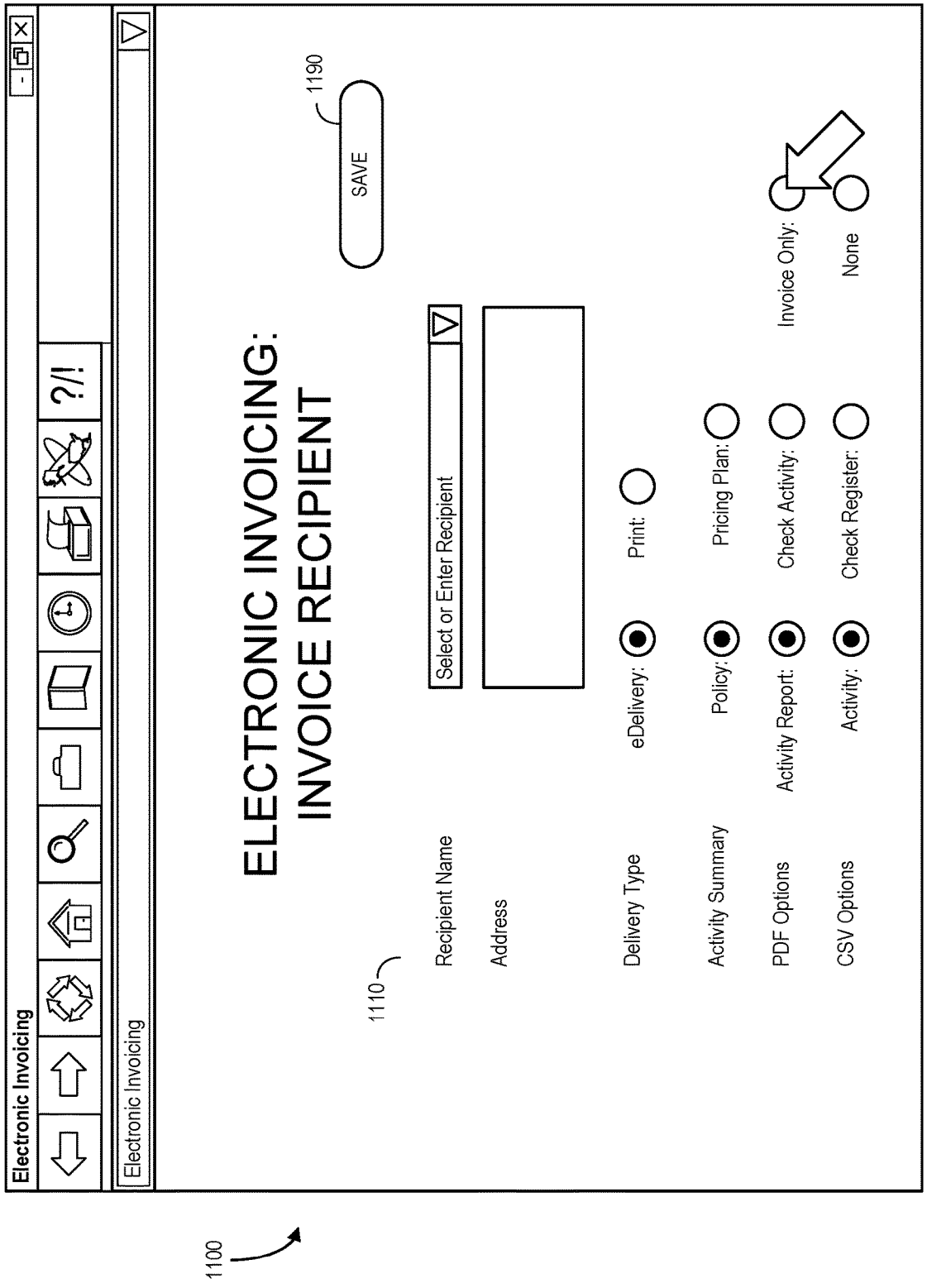
FIG. 11 is an invoice recipient display according to some embodiments.

FIG. 11 is an invoice recipient display 1100 according to some embodiments. The display 1100 may include a data entry area 1110 that may be used to define a new recipient for invoices (e.g., a recipient name/email address, postal address, etc.). The display 1100 may also be used to define a delivery type (e.g., if the invoice is to be emailed, this may be set to "eDelivery" via a script at implementation) and an output selection indicating what the customer will receive. For the output options, a user may select one item from each row above when setting up a new invoice schedule. At conversion, the following options will be preselected via an Information Technology ("IT") script:

activity summary options (with a default set up being policy);
activity summary options;
a PDF option (with a default set up of activity report);
an activity report PDF option and policy summary option;
a CSV option (with a default set up of activity); and
an activity CSV.

Note that the delivery options (e.g., for PDF and CSV invoices) may be saved on a recipient-by-recipient basis. For example, each customer might be associated with up to three recipients, and one recipient might be designated as receiving an "invoice only" for PDF invoice while another recipient is designated as receiving an "activity report." In some embodiments, the delivery options on the display 1100 may be saved on a customer-by-customer basis. According to some embodiments, a "Save" icon 1190 may be used to store the new invoice recipient. Other information that might be entered into the system might include a pricing plan activity summary, an invoice only option, a check register option, etc.

Figure 12:
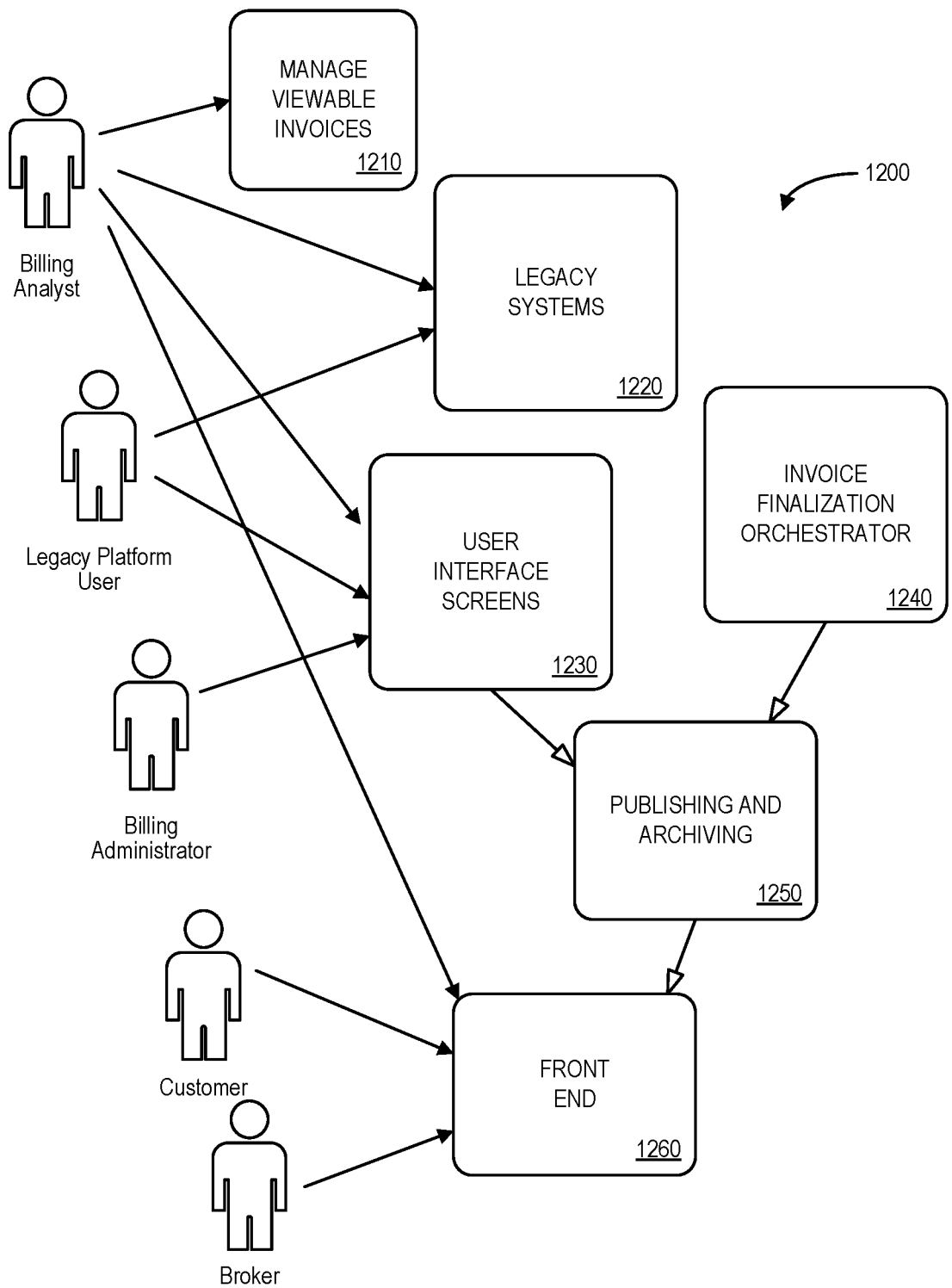
FIG. 12 illustrates use cases for an invoicing system in accordance with some embodiments.

FIG. 12 illustrates use cases 1200 for an invoicing system in accordance with some embodiments. The use cases 1200 may be associated with an internal billing analyst who has access to a front end 1260 to review billing and program information that customers and brokers are viewing (e.g., the billing analyst may use Webtop to manage viewable invoices 1210 by hiding or unhiding billing invoices that are viewable in the front end 1260). The use cases 1200 may also be associated with users of a legacy system 1220 (e.g., to generate invoices, update WIP invoices based on input from a legacy platform user, mark invoices as WIP, etc.), billing administrators, customers, insurance brokers, etc. The use cases 1200 may include user interface screens 1230 (e.g., to view invoices, edit invoices, create WIP invoices, unlock WIP invoices, search invoices, approve a WIP invoice, cancel or delete a WIP invoice, etc.), an invoice finalization orchestrator 1240 (e.g., to assemble invoice data, create invoice meta data, and send invoice data to a publishing component), publishing and archiving 1250 (e.g., to publish an online invoice, finalize batch invoices, archive invoices, use delivery preference, communicated with the front end 1260, and deliver invoices), etc.

Figure 13:
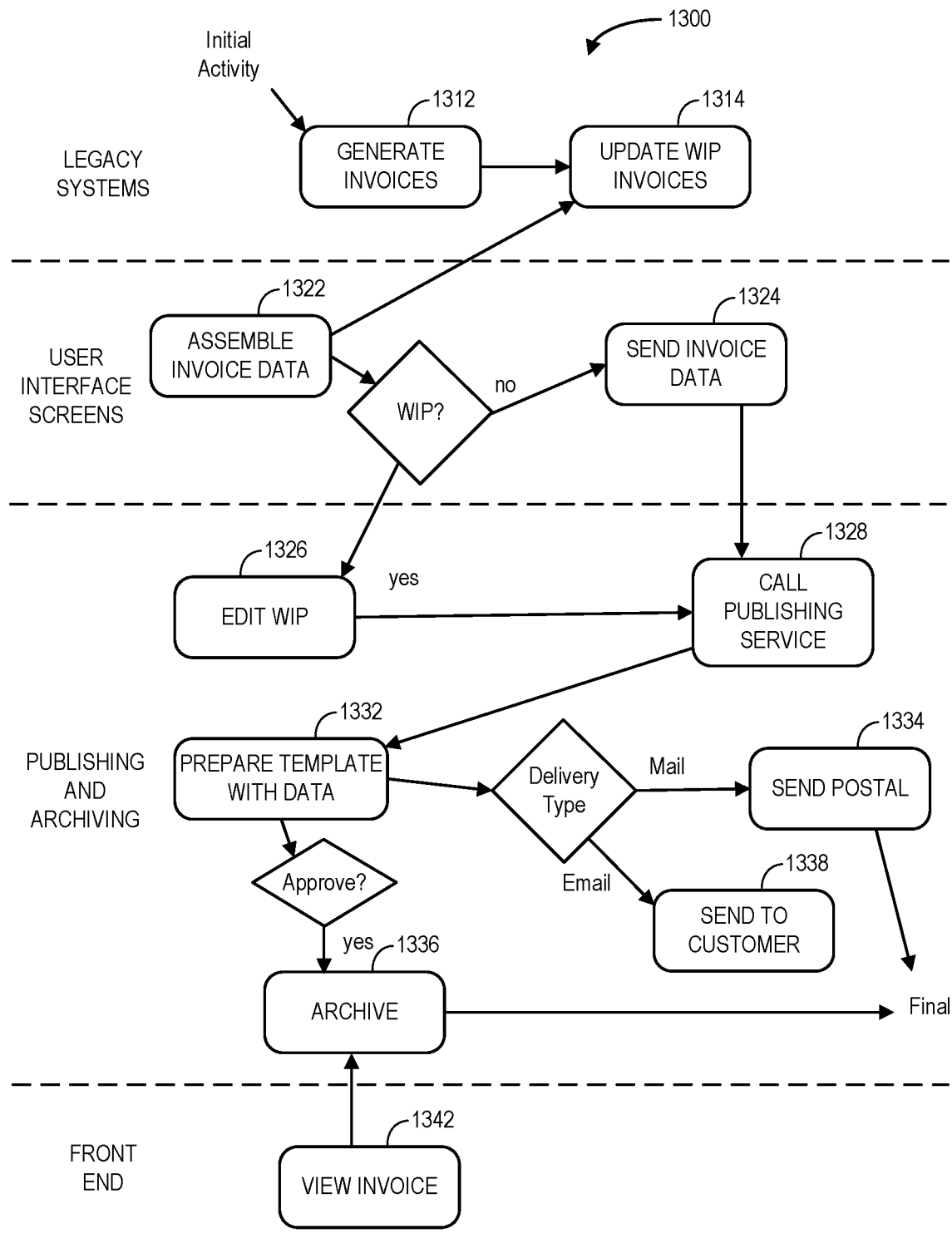
FIG. 13 is an activity diagram for an invoicing system according to some embodiments.

FIG. 13 is an activity diagram 1300 for an invoicing system according to some embodiments. Initially, one or more legacy system components may generate invoices 1312 and update WIP invoices 1314. User interface screen components may then assemble invoice data 1322 and (if it is not a WIP) send the invoicing data 1324 by calling a publishing service 1328 associated with a publishing and archiving component. If it is a WIP, the user may edit the WIP 1326 before calling the publishing service 1328. The publishing and archiving component may prepare a template with data 1332 and then send via postal mail 1334 or email to the customer 1338 based on delivery type. Moreover, an approved invoice may be archived 1336 when approved for later viewing 1342 via a front end component.

Figure 14:
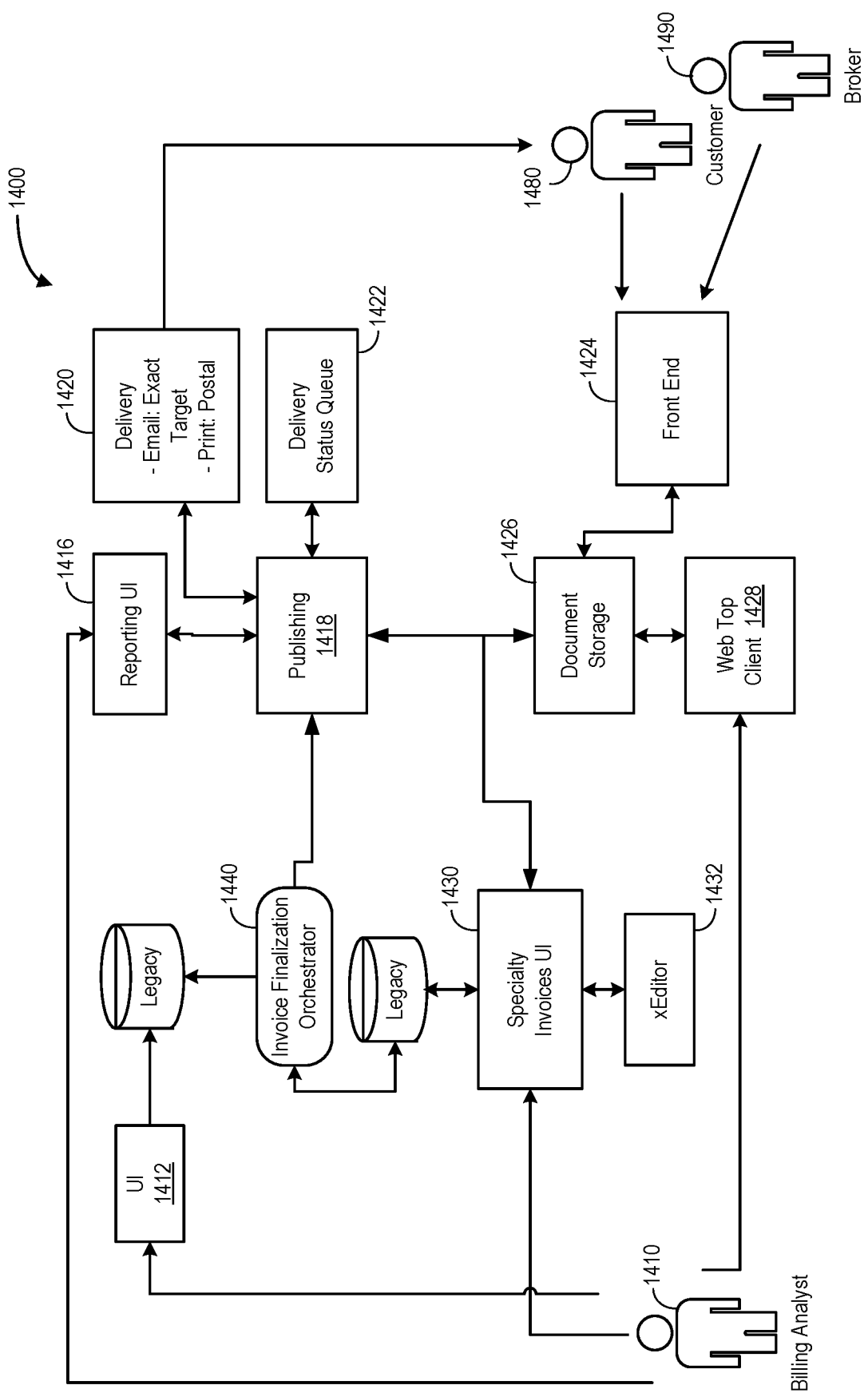
FIG. 14 is a project component diagram for an invoice system in accordance with some embodiments.

FIG. 14 is a project component diagram 1400 for an invoice system in accordance with some embodiments. A billing analyst 1410 may interact with a specialty invoices User Interface ("UP") 1430 to search, create, revise (e.g., via xEditor 1432, approve, cancel, or indicate "WIP" invoices. The billing analyst 1410 may also interact with an invoice finalization orchestrator 1440 via legacy storage and UI 1412. The orchestrator 1440 may send invoice data files to publishing 1418 (e.g., CSV, meta data, email address, delivery preferences, etc.). According to some embodiments, the publishing 1418 may also create an hourly batch to retrieve applicable data, create and send required data for editing and approval, save invoice meta data for searching by the billing analyst 1410. The publishing 1418 may also be accessed by the billing analyst 1410 via a reporting UI 1416. According to some embodiments, the publishing 1418 uses set up templates to create invoice CSV and PDF files and archive finalized invoices in document storage 1426. The billing analyst 1410 may then access the information in document storage via a web top client 1428 to search, upload, view, and edit document properties as applicable. Similarly, customers 1480 and brokers 1490 may access invoices in document storage 1426 via a front end 1424. Finally, the publishing 1418 may arrange for invoice delivery 1420 (e.g., via email or postal mail) in accordance with a delivery status queue 1422.

Figure 15:
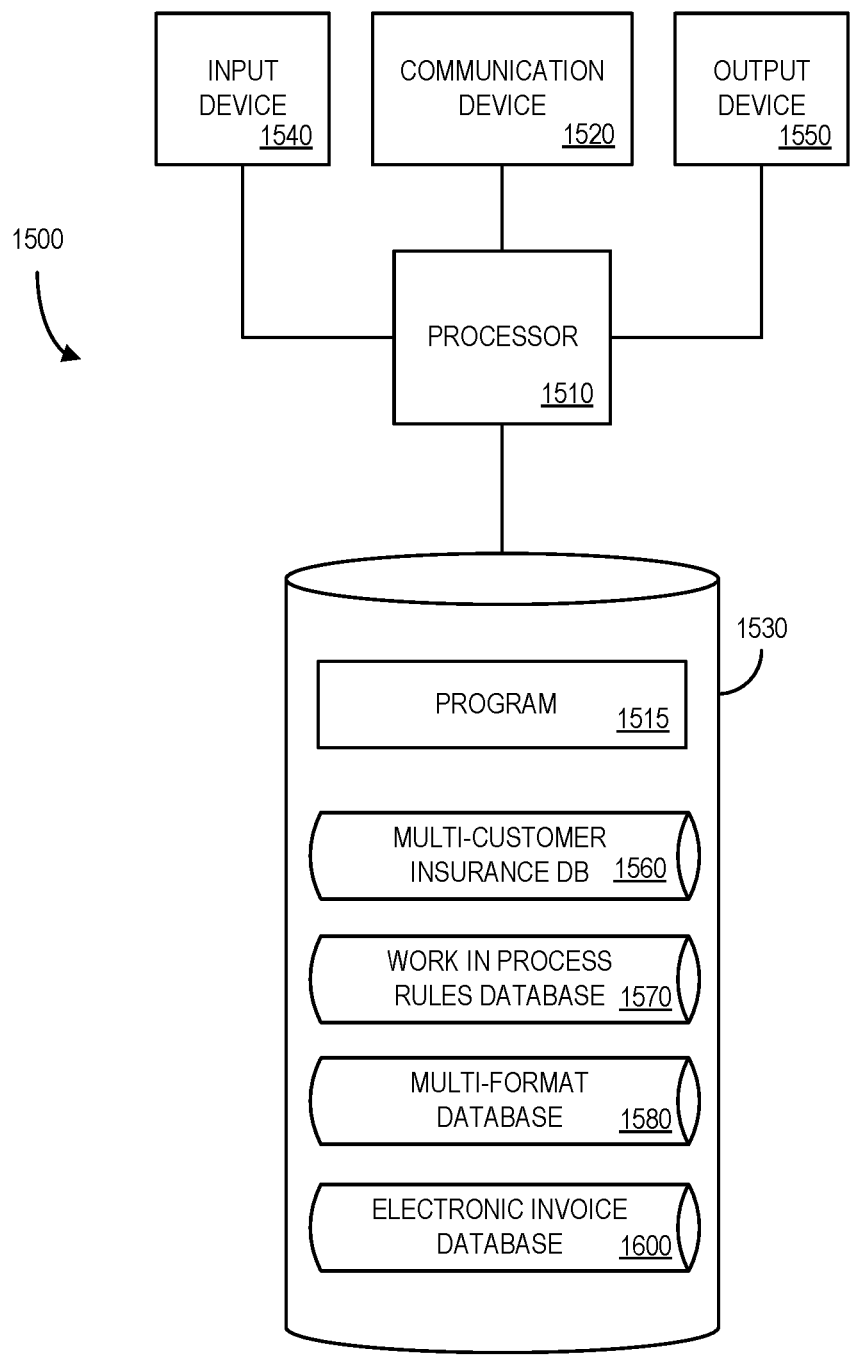
FIG. 15 is a block diagram of an apparatus in accordance with some embodiments of the present invention.

The embodiments described herein may be implemented using any number of different hardware configurations. For example, FIG. 15 illustrates an apparatus 1500 that may be, for example, associated with the systems 100, 300 described with respect to FIGS. 1 and 3, respectively. The apparatus 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote administrator computers and or communication devices (e.g., PCs and smartphones). Note that communications exchanged via the communication device 1520 may utilize security features, such as those between a public internet user and an internal network of the insurance enterprise. The security features might be associated with, for example, web servers, firewalls, and/or PCI infrastructure. The apparatus 1500 further includes an input device 1540 (e.g., a mouse and/or keyboard to enter information about WIP rules) and an output device 1550 (e.g., to output reports regarding customer statistics and analytics).

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1515 and/or a risk evaluation tool or application for controlling the processor 1510. The processor 1510 performs instructions of the program 1515, and thereby operates in accordance with any of the embodiments described herein. For example, the processor 1510 may receive invoice data (associated with a customer of the enterprise) from remote invoice platforms and then create invoice documents in first and second formats based on information in the invoice data store. It may be determined by the processor 1510 that the invoice documents represent "work in process" and, as a result, the processor 1510 may prevent the invoice documents from being transmitted to a customer device. An adjustment to the invoice document in an intermediate format is received by the processor 1510 and the invoice document in at least one of the first and second format is automatically updated. When it is later determined that the invoice documents no longer represent "work in process," the processor 1510 electronically transmits the invoice documents to the customer device.

The program 1515 may be stored in a compressed, uncompiled and/or encrypted format. The program 1515 may furthermore include other program elements, such as an operating system, a database management system, and/or device drivers used by the processor 1510 to interface with peripheral devices.

As used herein, information may be "received" by or "transmitted" to, for example: (i) the electronic invoicing system computer server 1500 from another device; or (ii) a software application or module within the electronic invoicing system computer server 1500 from another software application, module, or any other source.

In some embodiments (such as shown in FIG. 15), the storage device 1530 further stores a multi-customer insurance database 1560 (e.g., containing information about insurance enterprise customers), a work in process rules database 1570 (e.g., when should an invoice be automatically flagged as a WIP?), a multi-format database 1580 (e.g., containing information about CSV and PDF file formats), and an electronic invoice database 1600. An example of a database that might be used in connection with the apparatus 1500 will now be described in detail with respect to FIG. 16. Note that the database described herein is only an example, and additional and/or different information may be stored therein. Moreover, various databases might be split or combined in accordance with any of the embodiments described herein. For example, the multi-customer database 1560 and WIP rules database 1570 might be combined and/or linked to each other within the program 1515.

Figure 16:
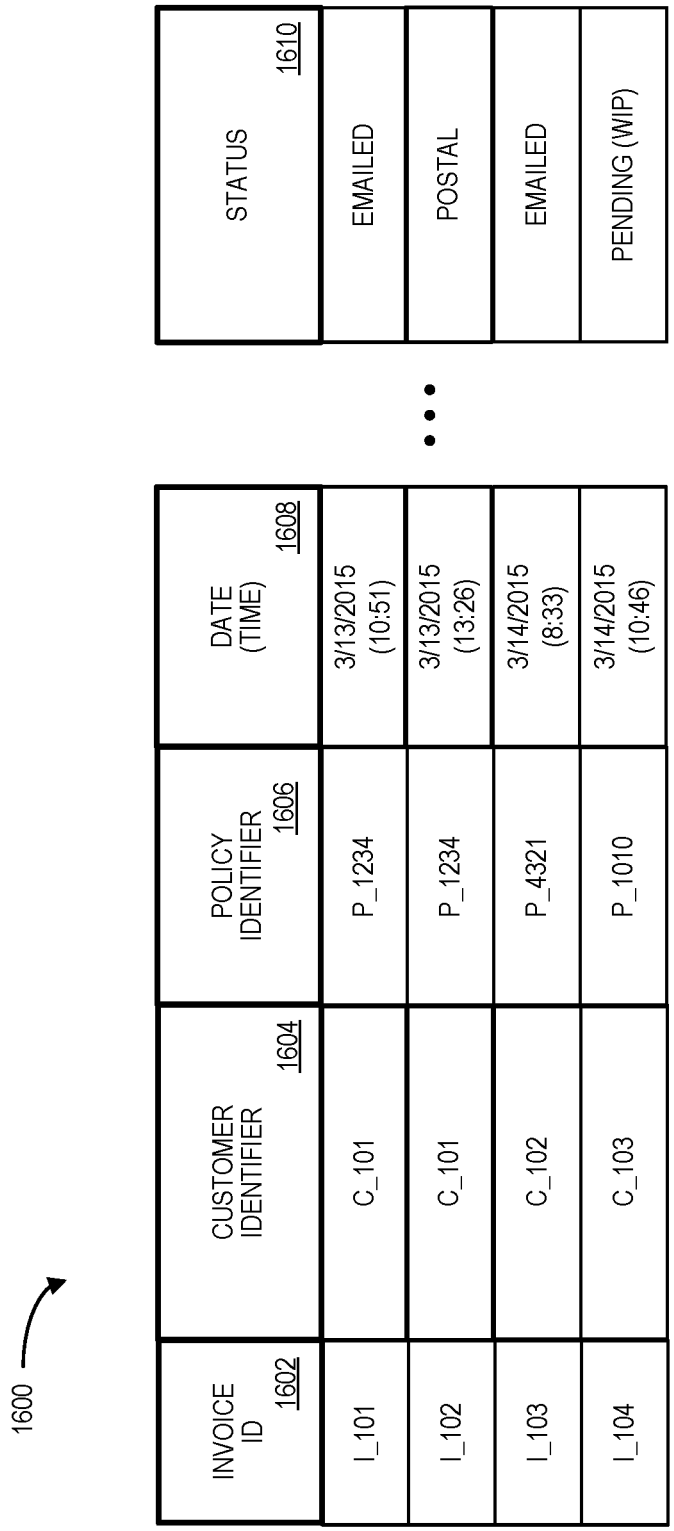
FIG. 16 is a portion of a tabular electronic invoice database according to some embodiments.

Referring to FIG. 16, a table is shown that represents the electronic invoice database 1600 that may be stored at the apparatus 1500 according to some embodiments. The table may include, for example, entries associated with invoice documents (e.g., CSV and PDF documents). The table may also define fields 1602, 1604, 1606, 1608, 1610 for each of the entries. The fields 1602, 1604, 1606, 1608, 1610 may, according to some embodiments, specify: an invoice identifier 1602, a customer identifier 1604, a policy identifier 1606, a date and time 1608, and a status 1610. The electronic invoice database 1600 may be created and updated, for example, based on information electrically exchanged with legacy invoice systems, billing analysts, etc.

The invoice identifier 1602 may be, for example, a unique alphanumeric code identifying invoice documents (e.g., CSV and PDF files) for a customer of an insurance enterprise. The customer identifier 1604 might identify the customer and the policy identifier 1606 might identify the insurance policy or agreement associated with the invoice. The data and time 1608 might indicate when the invoices were created, and the status 1610 might indicate that an invoice has been emailed, sent via postal mail, is currently pending (e.g., a work in process), etc.

Thus, embodiments may reduce costs, replace manual processes, and improve branding for billing invoices sent to customers and brokers (e.g., by using customized templates and images to create multiple documents for an invoice). Moreover, some embodiments may be associated with some or all of:

- template-based invoices;
- publishing, editing, and emailing invoices;
- electronic storage and/or archiving of billing invoices, and
- invoice access and/or viewing for customers and brokers.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 17:
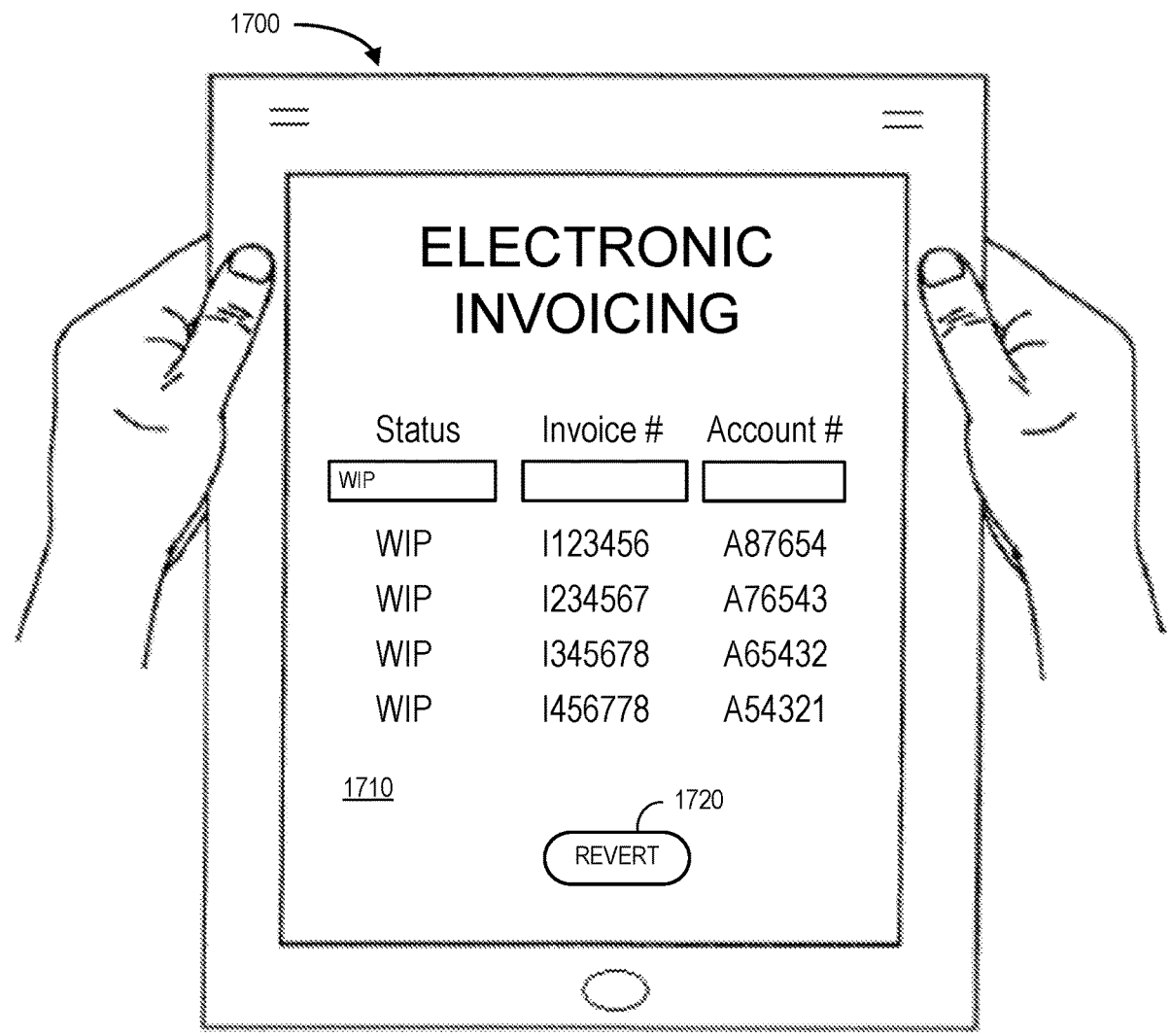
FIG. 17 illustrates a tablet computer displaying an information sharing user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies or agreements, embodiments may instead be associated with other types of insurance agreements in additional to and/or instead of the policies described herein (e.g., business insurance policies, TPA insurance arrangements, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 17 illustrates a handheld tablet computer 1700 showing an electronic invoicing system display 1710 according to some embodiments. The electronic invoicing system display 1710 might include user-selectable data that can be selected and/or modified by a user of the handheld computer 1700 to provide updated invoice information associated with an insurance enterprise (e.g., via entry of search terms and/or activation of a "Revert" icon 1720 to clear those search terms).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to facilitate an exchange of information via an electronic invoicing system computer server of an enterprise, comprising:
   (a) an invoice data store containing electronic records representing a plurality of invoices associated with multiple customers and the enterprise and, for each invoice, an electronic record identifier and a set of attribute values;
   (b) the electronic invoicing system computer server, coupled to the invoice data store, programmed to:
      (i) receive invoice data from a plurality of remote invoice platforms, the received data being associated with a customer of the enterprise,
      (ii) arrange to create two invoice documents based on information in the invoice data store: a first invoice document in a first format and a second invoice document in a second format, different than the first format,
      (iii) determine that the invoice documents represent "work in process,"
      (iv) responsive to the determination that the invoice documents represent "work in process," prevent the invoice documents from being transmitted to at least one remote customer device,
      (v) receive from a user an adjustment to the invoice document in an intermediate format,
      (vi) automatically update the first invoice document in the first format and the second invoice document in the second format based on the received adjustment from the user in the intermediate format,
      (vii) determine that the invoice documents no longer represent "work in process," and
      (viii) responsive to the determination that the invoice documents no longer represent "work in process," arrange to electronically transmit the invoice documents in the first and second formats to the at least one remote customer device; and
   (c) a communication port coupled to the electronic invoicing system computer server to facilitate an exchange of data with an invoicing system interface display via a distributed communication network.

2. The system of claim 1, wherein the user adjustment to the document is an adjustment to less than all of a plurality of fields in the document.

3. The system of claim 1, wherein the user adjustment to the document includes a personalized note to the invoice document via the invoicing system interface display.

4. The system of claim 1, wherein following the determination that the invoice documents represent "work in process," displaying a last person to edit the document.

5. The system of claim 1, wherein the determination that the invoice documents represent "work in process," is based on detection of pre-set conditions based on a set of rules.

6. The system of claim 1, wherein the determination that the invoice documents represent "work in process," is based on selection of a flag.

7. The system of claim 6, wherein the selection is from a user via the invoicing system interface display.

8. The system of claim 1, wherein a printed version of the invoice documents is also sent to a customer address via postal mail.

9. The system of claim 1, wherein the set of attribute values includes a status comprising any of: "work in process," "deleted," "complete."

10. A computerized method to facilitate an exchange of information via an electronic invoicing system computer server of an enterprise, comprising:
   receiving, by the electronic invoicing system computer server, invoice data from a plurality of remote invoice platforms, the received data being associated with a customer of the enterprise;
   arranging to create two invoice documents based on information in an invoice data store: a first invoice document in a first format and a second invoice document in a second format, different than the first format, wherein the invoice data store contains electronic records representing a plurality of invoices associated with multiple customers and the enterprise and, for each invoice, an electronic record identifier and a set of attribute values;
   determining that the invoice documents represent "work in process;"
   responsive to the determination that the invoice documents represent "work in process," preventing the invoice documents from being transmitted to at least one remote customer device;
   receiving from a user an adjustment to the invoice document in an intermediate format;
   automatically updating the first invoice document in the first format and the second invoice document in the second format based on the received adjustment from the user;
   determining that the invoice documents no longer represent "work in process;" and
   responsive to the determination that the invoice documents no longer represent "work in process," arranging to electronically transmit the invoice documents in the first and second formats to the at least one remote customer device.

11. The method of claim 10, wherein the user adjustment to the document is an adjustment to less than all of a plurality of fields in the document.

12. The method of claim 10, wherein the user adjustment to the document includes a personalized note to the invoice document.

13. The method of claim 10, wherein following the determination that the invoice documents represent "work in process," displaying a last person to edit the document.

14. The method of claim 10, wherein the determination that the invoice documents represent "work in process," is based on detection of pre-set conditions based on a set of rules.

15. The method of claim 10, wherein the determination that the invoice documents represent "work in process," is based on selection of a flag.

16. The method of claim 15, wherein the selection is from a user via an invoicing system interface display.

17. A non-transitory, computer-readable medium storing instructions, that, when executed by a processor, cause the processor to perform a method to facilitate an exchange of information via an electronic invoicing system computer server of an enterprise, the method comprising:
   receiving, by the electronic invoicing system computer server, invoice data from a plurality of remote invoice platforms, the received data being associated with a customer of the enterprise;
   arranging to create two invoice documents based on information in the invoice data store: a first invoice document in a first format and a second invoice document in a second format, different than the first format, wherein the invoice data store contains electronic records representing a plurality of invoices associated with multiple customers and the enterprise and, for each invoice, an electronic record identifier and a set of attribute values;

determining that the invoice documents represent "work in process;"

responsive to the determination that the invoice documents represent "work in process," preventing the invoice documents from being transmitted to at least one remote customer device;

receiving from a user an adjustment to the invoice document in an intermediate format;

automatically updating the first invoice document in the first format and the second invoice document in the second format based on the received adjustment from the user;

determining that the invoice documents no longer represent "work in process;" and responsive to the determination that the invoice documents no longer represent "work in process," arranging to electronically transmit the invoice documents in the first and second formats to the at least one remote customer device.

18. The medium of claim 17, wherein the user adjustment to the document includes a personalized note to the invoice document.

19. The medium of claim 17, wherein following the determination that the invoice documents represent "work in process," displaying a last person to edit the document.

20. The medium of claim 17, wherein the determination that the invoice documents represent "work in process," is based on one of: i. detection of pre-set conditions based on a set of rules and ii. selection of a flag.

* * * * *